United States Patent
Yamashita et al.

(10) Patent No.: US 9,739,622 B2
(45) Date of Patent: Aug. 22, 2017

(54) SYSTEM AND METHOD FOR SELECTING PATH ACCORDING TO SELECTION CONDITIONS

(71) Applicant: YUAN ZE UNIVERSITY, Taoyuan (TW)

(72) Inventors: Reijo Yamashita, Ibaraki (JP); Hiroki Yamashita, Ibaraki (JP); Hsiu-Hsen Yao, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 508 days.

(21) Appl. No.: 14/561,224

(22) Filed: Dec. 5, 2014

(65) Prior Publication Data

US 2016/0162484 A1    Jun. 9, 2016

(51) Int. Cl.
*G01C 21/00* (2006.01)
*G01C 21/34* (2006.01)

(52) U.S. Cl.
CPC ......... *G01C 21/34* (2013.01); *G01C 21/3484* (2013.01)

(58) Field of Classification Search
None
See application file for complete search history.

(56) References Cited

U.S. PATENT DOCUMENTS

| | | | | |
|---|---|---|---|---|
| 7,512,487 B1 * | 3/2009 | Golding | ............. | G01C 21/3484 701/424 |
| 8,090,532 B2 * | 1/2012 | Tashev | ............... | G01C 21/3461 340/990 |
| 8,744,766 B2 * | 6/2014 | Rakshit | ............. | G01C 21/3461 340/632 |
| 9,146,129 B1 * | 9/2015 | Furio | ................. | G01C 21/3682 |
| 9,384,661 B1 * | 7/2016 | DeLuca | ........... | G08G 1/096838 |
| 9,568,331 B1 * | 2/2017 | Narang | ............. | G01C 21/3617 |
| 9,625,266 B1 * | 4/2017 | Chintakindi | ........ | G01C 21/3415 |
| 2002/0120396 A1 * | 8/2002 | Boies | ................... | G06Q 10/047 701/424 |
| 2008/0153512 A1 * | 6/2008 | Kale | ....................... | H04W 4/02 455/456.3 |
| 2013/0006521 A1 * | 1/2013 | Needham | ............. | G01C 21/343 701/426 |
| 2013/0103313 A1 * | 4/2013 | Moore | ................... | G01C 21/20 701/533 |
| 2014/0222330 A1 * | 8/2014 | Kohlenberg | ........... | G06Q 50/14 701/425 |
| 2014/0278070 A1 * | 9/2014 | McGavran | ............. | G01C 21/00 701/465 |
| 2014/0279723 A1 * | 9/2014 | McGavran | ........... | G06N 99/005 706/11 |
| 2014/0365126 A1 * | 12/2014 | Vulcano | ................. | G01C 21/36 701/533 |
| 2015/0241235 A1 * | 8/2015 | Lobato Fregoso | .... | G01C 21/36 701/423 |

(Continued)

*Primary Examiner* — Jonathan M Dager
(74) *Attorney, Agent, or Firm* — Chih Feng Yeh; Huntington IP Consulting Co., Ltd.

(57) ABSTRACT

A system and method for selecting a path according to a plurality of selection conditions are disclosed, where a vehicle traveling history data stored in the plurality type of driving data recorder (DDR) databases established previously are analyzed, and then a plurality type of DDR databases are screened out by further referring to a plurality of type ratios provided by the user are screened out, and then a desired path is selected.

10 Claims, 10 Drawing Sheets

(56) References Cited

U.S. PATENT DOCUMENTS

2016/0209220 A1* 7/2016 Laetz .................... G08G 1/202
2016/0298977 A1* 10/2016 Newlin .............. G01C 21/3423
2016/0341564 A1* 11/2016 Cheng ................ G01C 21/3641
2016/0358477 A1* 12/2016 Ansari .................. G08G 1/167

* cited by examiner

FIG. 4A

| path 21 | car traveling information 22 |
|---|---|
| path node A — path node B — path node C — path node F — path node I 211 | car traveling time 300 seconds ; car traveling time 295 seconds ; car traveling time 305 seconds ; car traveling time 300 seconds 221 |
| path node A — path node B — path node E — path node F — path node I 212 | car traveling time 350 seconds ; car traveling time 360 seconds ; car traveling time 340 seconds ; car traveling time 350 seconds 222 |
| path node A — path node D — path node E — path node F — path node I 213 | car traveling time 400 seconds ; car traveling time 390 seconds ; car traveling time 410 seconds ; car traveling time 400 seconds 223 |
| path node A — path node D — path node E — path node H — path node I 214 | car traveling time 420 seconds ; car traveling time 410 seconds ; car traveling time 430 seconds ; car traveling time 420 seconds 224 |
| path node A — path node D — path node G — path node H — path node I 215 | car traveling time 500 seconds ; car traveling time 490 seconds ; car traveling time 510 seconds ; car traveling time 500 seconds 225 |

FIG. 4B

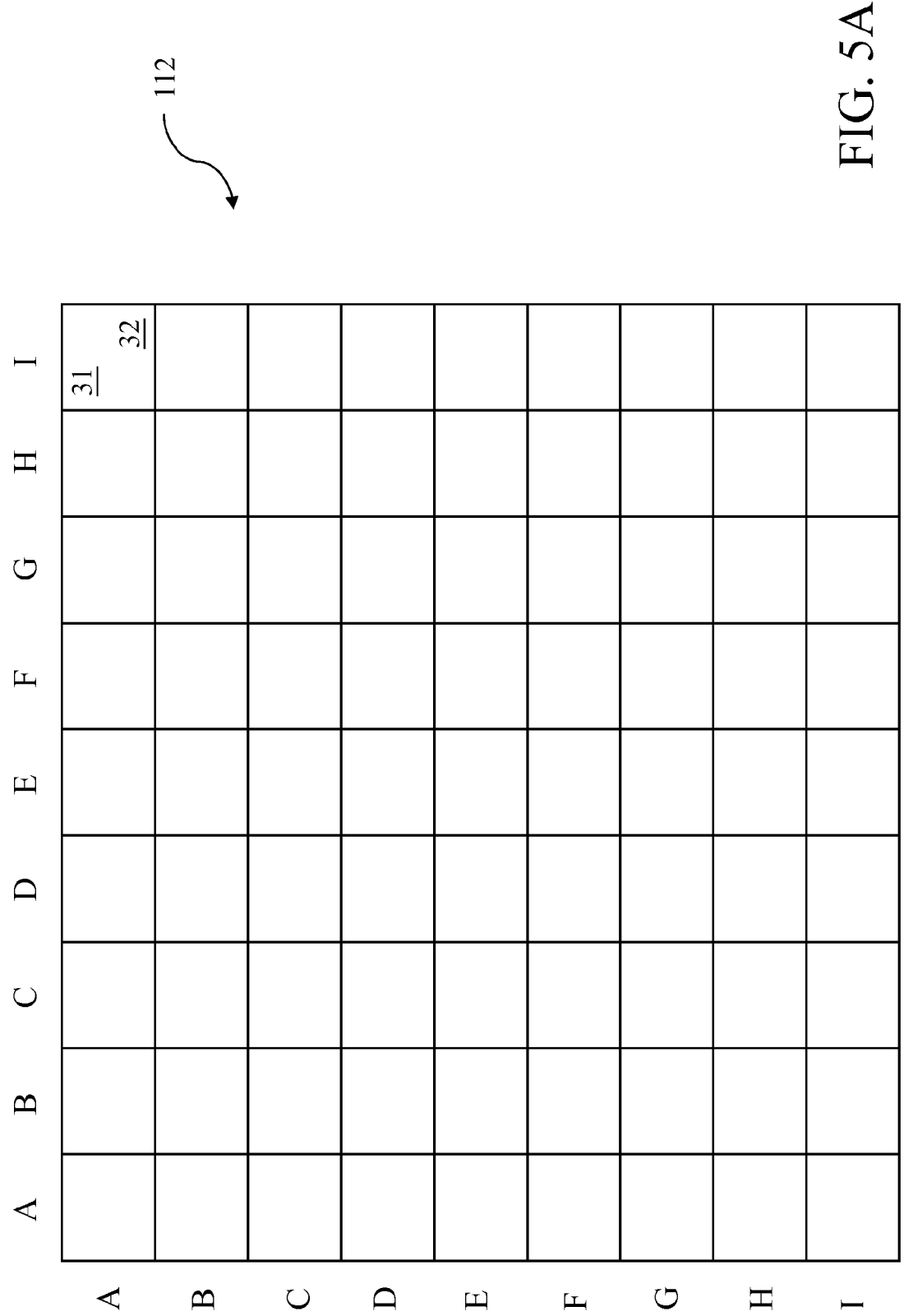

| path <u>31</u> | car traveling information <u>32</u> |
|---|---|
| path node A — path node B — path node C — path node F — path node I <u>311</u> | car traveling oil consuming 1 liter ; car traveling oil consuming 0.9 liters ; car traveling oil consuming 1.1 liter ; car traveling oil consuming 1 liter <u>321</u> |
| path node A — path node B — path node E — path node F — path node I <u>312</u> | car traveling oil consuming 0.5 liters ; car traveling oil consuming 0.45 liters ; car traveling oil consuming 0.55 liters ; car traveling oil consuming 0.5 liters <u>322</u> |
| path node A — path node D — path node E — path node F — path node I <u>313</u> | car traveling oil consuming 1.2 liters ; car traveling oil consuming 1 liter ; car traveling oil consuming 1.4 liters ; car traveling oil consuming 1.2 liters <u>323</u> |
| path node A — path node D — path node E — path node H — path node I <u>314</u> | car traveling oil consuming 1.5 liters ; car traveling oil consuming 1.6 liters ; car traveling oil consuming 1.4 liters ; car traveling oil consuming 1.5 liters <u>324</u> |
| path node A — path node D — path node G — path node H — path node I <u>315</u> | car traveling oil consuming 1.7 liters ; car traveling oil consuming 1.65 liters ; car traveling oil consuming 1.75 liters ; car traveling oil consuming 1.7 liters <u>325</u> |

FIG. 5B

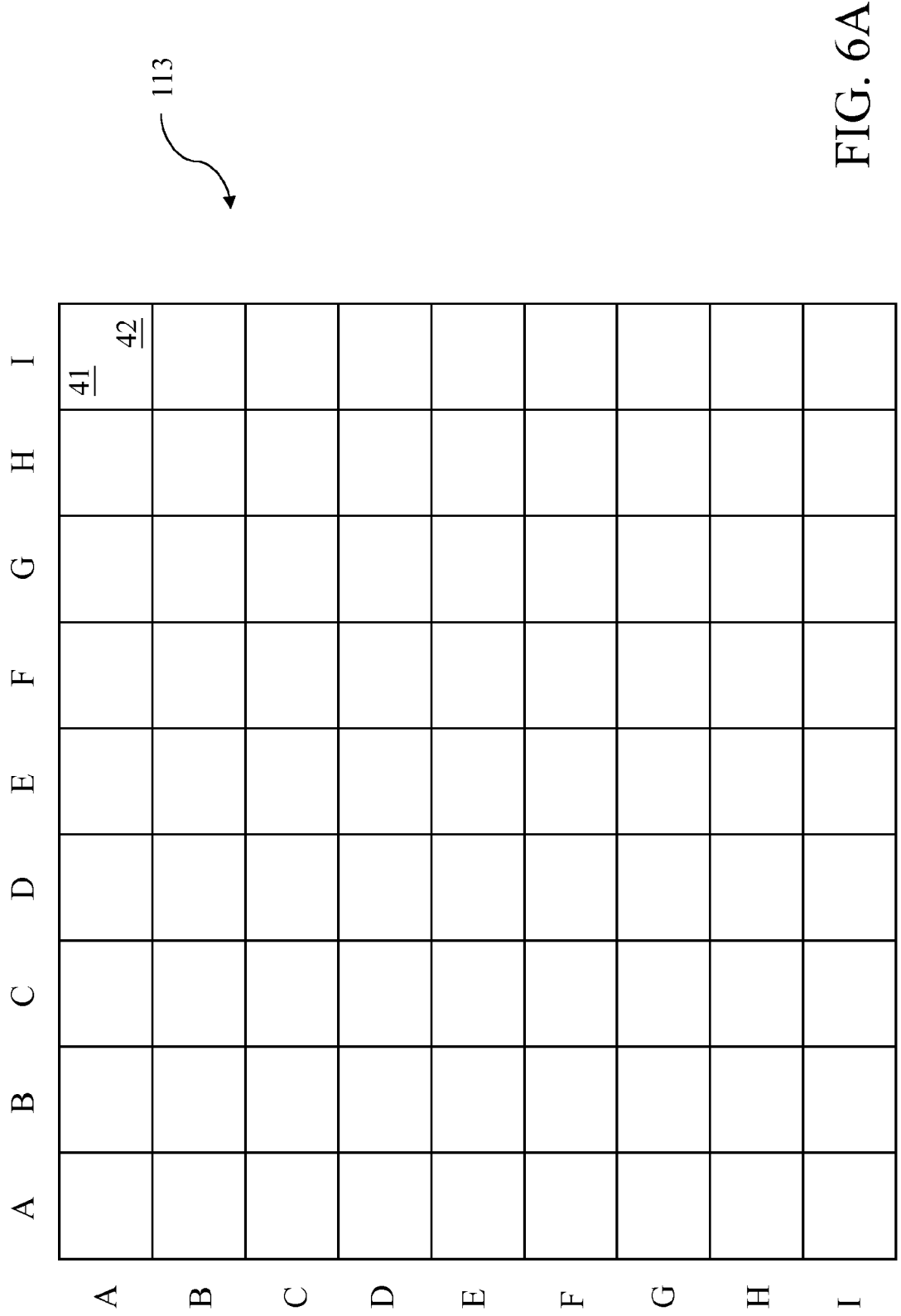

| path 41 | car traveling behavior 42 |
|---|---|
| path node A — path node B — path node C — path node F — path node I 411 | car traveling behavior value 3 ; car traveling behavior value 3.5 ; car traveling behavior value 2.5 ; car traveling behavior value 3 421 |
| path node A — path node B — path node E — path node F — path node I 412 | car traveling behavior value 4 ; car traveling behavior value 4 ; car traveling behavior value 4 ; car traveling behavior value 4 422 |
| path node A — path node D — path node E — path node F — path node I 413 | car traveling behavior value 5 ; car traveling behavior value 4.5 ; car traveling behavior value 4 ; car traveling behavior value 4.5 423 |
| path node A — path node D — path node E — path node H — path node I 414 | car traveling behavior value 2 ; car traveling behavior value 3 ; car traveling behavior value 1 ; car traveling behavior value 2 424 |
| path node A — path node D — path node G — path node H — path node I 415 | car traveling behavior value 0 ; car traveling behavior value 0.5 ; car traveling behavior value 1 ; car traveling behavior value 0.5 425 |

FIG. 6B

SYSTEM AND METHOD FOR SELECTING PATH ACCORDING TO SELECTION CONDITIONS

BACKGROUND OF THE RELATED ART

Technical Field

The present invention relates to a selection system and method, and particularly a system and method for selecting a path according to a plurality of selection conditions.

Related Art

With improvement of technology, more and more vehicle devices have been developed, such as a driving data recorder (DDRB) and a vehicle navigation device. These devices may effectively provide a user with a more convenient traveling course.

The currently available vehicle navigation device provides a path navigation function for a vehicle user, and which generally provides a shortest path as its navigation.

However, the vehicle navigation device may not satisfy the user's requirement according to the shortest path. For example, the user may wish a multiple traveling conditions, such as safety, comfort, timing-saving, and oil-saving, which cannot be provided by the shortest path manner.

In view of the above, it may be known that there has long been an issue where the shortest path manner provided by the vehicle navigation device cannot satisfy the multiple vehicle traveling conditions. Therefore, there is a need to provide a technical means to solve this problem.

SUMMARY

In view of the issue encountered in the prior art where the shortest path manner provided by the vehicle navigation device cannot satisfy the multiple vehicle traveling conditions, the present invention discloses a system and method for selecting a path according to a plurality of selection conditions.

According to the present invention, the system for selecting a path according to a plurality of selection conditions comprises providing a plurality type of driving data recorder (DDR) databases, each storing a plurality of paths from each of a plurality of path nodes to another of the plurality of path nodes and a set of vehicle traveling history data for the plurality of paths, the set of vehicle traveling history data corresponding to one of the plurality of selection conditions; a receiving module, receiving an initial path node, an end path node, and a set of type ratios, the set of type ratios having a plurality of ratios each corresponding to one of the plurality type of DDR databases; a querying module, querying the set of vehicle traveling history data according to the initial path node to the end path node and the plurality of paths corresponding thereto from each of the plurality type of DDR databases; a calculating module, calculating the set of vehicle traveling history data for each of the plurality of paths stored in each of the plurality type of DDR databases to obtain a calculation result, respectively, and providing a type calculation data for each of the plurality of paths according to the calculation result, respectively; and a path providing module, normalizing the set of type ratios and the type calculation data of the plurality of paths corresponding to each of the plurality type of DDR databases, respectively, calculating an average mix rank for each of the plurality of paths by giving a weight to normalized the type calculation data, and sorting the plurality of paths according to the average mix rank, so that a user is able to select path.

According to the present invention, the method for selecting a path according to a plurality of selection conditions comprises steps of: a plurality type of DDR databases, each storing a plurality of paths from each of a plurality of path nodes to another of the plurality of path nodes and a set of vehicle traveling history data for the plurality of paths, the set of vehicle traveling history data corresponding to one of the plurality of selection conditions; receiving an initial path node, an end path node, and a set of type ratios, the set of type ratios having a plurality of ratios each corresponding to one of the plurality type of DDR databases; querying the set of vehicle traveling history data according to the initial path node to the end path node and the plurality of paths corresponding thereto from each of the plurality type of DDR databases; calculating the set of vehicle traveling history data for each of the plurality of paths stored in each of the plurality type of DDR databases to obtain a calculation result, respectively, and providing a type calculation data for each of the plurality of paths according to the calculation result, respectively; and normalizing the set of type ratios and the type calculation data of the plurality of paths corresponding to each of the plurality type of DDR databases, respectively, calculating an average mix rank for each of the plurality of paths by giving a weight to normalized the type calculation data, and sorting the plurality of paths according to the average mix rank, so that a user is able to select path.

The system and method of the present invention has the difference as compared to the prior art that the vehicle traveling history data stored in the plurality type of DDR databases established previously are analyzed, and then the plurality type of DDR databases are screened out by further referring to the plurality of type ratios provided by the user, and then a desired path is selected.

By use of the above technical means, the technical efficacy of providing a path selection by integrating a plurality of vehicle traveling conditions may be achieved.

BRIEF DESCRIPTION OF THE DRAWINGS

The present invention will be better understood from the following detailed descriptions of the preferred embodiments according to the present invention, taken in conjunction with the accompanying drawings, in which:

FIG. 4A is a schematic diagram of a first driving data recorder (DDR) databases according to the present invention;

FIG. 4B is a schematic diagram of a vehicle traveling history data of the first DDR databases according to the present invention;

FIG. 5A is a schematic diagram of a second DDR databases according to the present invention;

FIG. 5B is a schematic diagram of the vehicle traveling history data of the second DDR databases according to the present invention;

FIG. 6A is a schematic diagram of a third DDR databases according to the present invention;

FIG. 6B is a schematic diagram of the vehicle traveling history data of a third DDR databases according to the present invention;

DETAILED DESCRIPTION

Figure 1:
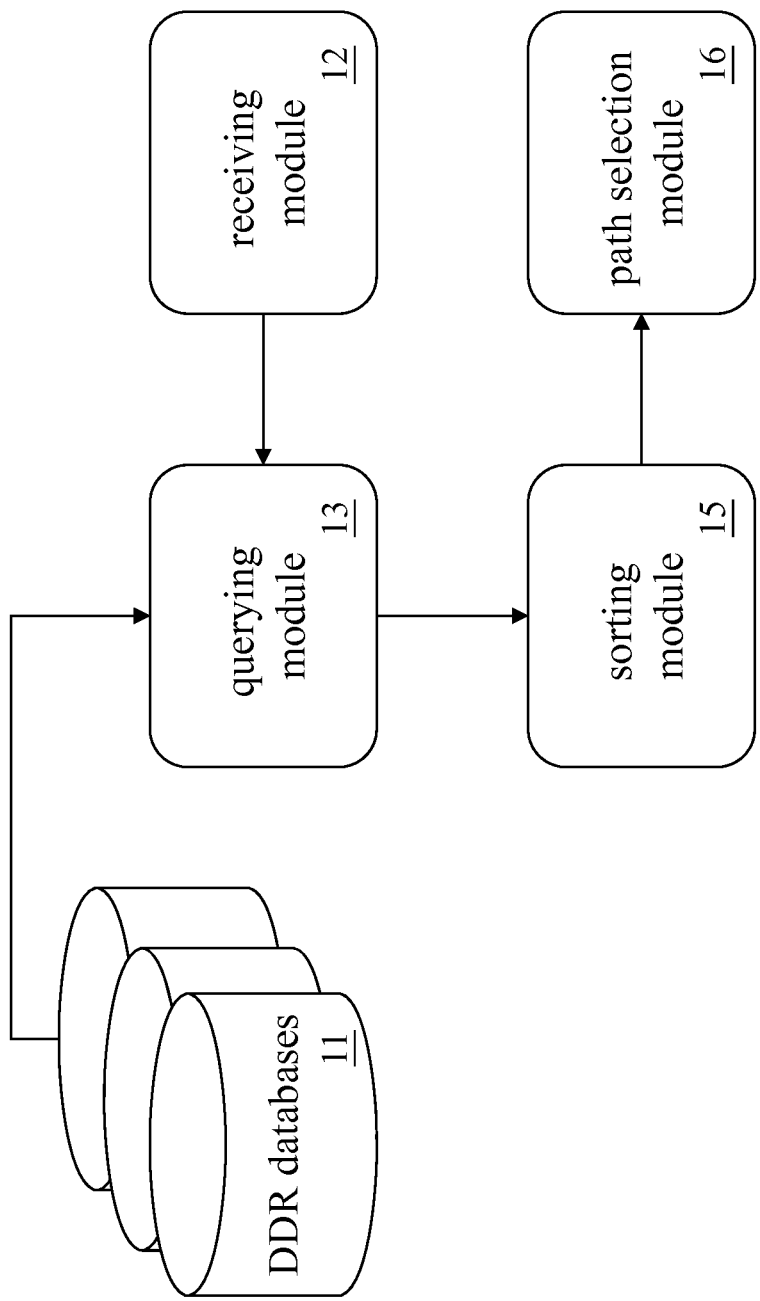
FIG. 1 is a schematic block diagram of a system for selecting a path according to a plurality of selection conditions according to the present invention.

The present invention will be apparent from the following detailed description, which proceeds with reference to the accompanying drawings, wherein the same references relate to the same elements.

In the following, the present invention will be described with reference to FIG. 1, which is a schematic block diagram of a system for selecting a path according to a plurality of selection conditions according to the present invention.

As shown, the system of the present invention comprises a plurality type of driving data recorder (DDR) databases 11, a receiving module 12, a querying module 13, a calculating module 15, and a path providing module 16.

Each of the DDR databases 11 has a set of vehicle traveling history data for each of a plurality of paths from one to the other of a plurality of path nodes constituting the plurality of paths stored therein. The set of vehicle traveling history data corresponds to a particular condition, different from the vehicle traveling history data for the other paths.

The mentioned path node is an intersection of actual roads, and at least two intersections are connected to form a path. The set of vehicle traveling history corresponding to a path is a data associated with the vehicle traveling long the path, and when a user vehicle travels on the path once, a vehicle traveling history among a set of the vehicle traveling history is generated. The vehicle traveling data may be a vehicle traveling time, a vehicle traveling oil consuming, a vehicle traveling 3D acceleration data, and a vehicle traveling indicator, etc, which are merely examples without limiting the present invention.

Among them, the vehicle traveling indicator which is calculated correspondence with one of the plurality of paths is obtained by synthetically analyzing a vehicle speed data, a vehicle traveling back-and-forth acceleration data, a braking behavior data, an engine rotation speed data, a steering wheel rotation data, a vehicle angular-speed data, a vehicle traveling lateral-acceleration data, a vehicle traveling longitudinal-acceleration data, and the like, in a vehicle traveling course. These are merely examples, without limiting the present invention.

For examples, in a first DDR databases type, paths constituted by path node A to path node I are stored, including a first path "path node A-path node B-path node C-path node F-path node I", a second path "path node A-path node B-path node E-path node F-path node I", a third path "path node A-path node D-path node E-path node F-path node I", a fourth path "path node A-path node D-path node E-path node H-path node I", and a fifth path "path node A-path node D-path node G-path node H-path node I". However, these are merely examples, without limiting the present invention.

With respect to the first path "path node A-path node B-path node C-path node F-path node I", the set of vehicle traveling history data includes "traveling time 300 seconds", "traveling time 295 seconds", "traveling time 305 seconds" and "traveling time 300 seconds". However, these are merely examples, without limiting the present invention.

With respect to the second path "path node A-path node B-path node E-path node F-path node I", the set of vehicle traveling history data includes "traveling time 350 seconds", "traveling time 360 seconds", "traveling time 340 seconds", and "traveling time 350 seconds". However, these are merely examples, without limiting the present invention.

With respect to the third path "path node A-path node D-path node E-path node F-path node I", the set of vehicle traveling history data includes "traveling time 400 seconds", "traveling time 390 seconds", "traveling time 410 seconds", and "traveling time 400 seconds". However, these are merely examples, without limiting the present invention.

With respect to the fourth path "path node A-path node D-path node E-path node H-path node I", the set of vehicle traveling history data includes "traveling time 420 seconds", "traveling time 410 seconds", "traveling time 430 seconds" and "traveling time 420 seconds". However, these are merely examples, without limiting the present invention.

With respect to the fifth path "path node A-path node D-path node G-path node H-path node I", the set of vehicle traveling history data includes "traveling time 500 seconds", "traveling time 490 seconds", "traveling time 510 seconds", and "traveling time 500 seconds". However, these are merely examples, without limiting the present invention.

In a second DDR database, the paths constituted by path node A to path node I are stored, including the first path "path node A-path node B-path node C-path node F-path node I", the second path "path node A-path node B-path node E-path node F-path node I", the third path "path node A-path node D-path node E-path node F-path node I", the fourth path "path node A-path node D-path node E-path node H-path node I", and the fifth path "path node A-path node D-path node G-path node H-path node I". However, these are merely examples, without limiting the present invention.

With respect to the first path "path node A-path node B-path node C-path node F-path node I", the set of vehicle traveling history data includes "vehicle traveling oil consumption 1 liters", "vehicle traveling oil consumption 0.9 liters", "vehicle traveling oil consumption 1.1 liters" and "vehicle traveling oil consumption 1 liters". However, these are merely examples, without limiting the present invention.

With respect to the second path "path node A-path node B-path node E-path node F-path node I", the set of vehicle traveling history data includes "vehicle traveling oil consumption 0.5 liters", "vehicle traveling oil consumption 0.45 liters", "vehicle traveling oil consumption 0.55 liters", and "vehicle traveling oil consumption 0.5 liters". However, these are merely examples, without limiting the present invention.

With respect to the third path "path node A-path node B-path node E-path node F-path node I", the set of vehicle traveling history data includes "vehicle traveling oil consumption 1.2 liters", "vehicle traveling oil consumption 1 liters", "vehicle traveling oil consumption 1.4 liters", and "vehicle traveling oil consumption 1.2 liters". However, these are merely examples, without limiting the present invention.

With respect to the fourth path "path node A-path node D-path node E-path node H-path node I", the set of vehicle traveling history data includes "vehicle traveling oil consumption 1.5 liters", "vehicle traveling oil consumption 1.6 liters", "vehicle traveling oil consumption 1.4 liters" and "vehicle traveling oil consumption 1.5 liters". However, these are merely examples, without limiting the present invention.

With respect to the fifth path "path node A-path node D-path node G-path node H-path node I", the set of vehicle traveling history data includes "vehicle traveling oil consumption 1.7 liters", "vehicle traveling oil consumption 1.65 liters", "vehicle traveling oil consumption 1.75 liters", and "vehicle traveling oil consumption 1.7 liters". However, these are merely examples, without limiting the present invention.

The user may select path node A as the initial path node, and path node I as the end path node at a user interface. Further, the user selects a first selection condition as "vehicle traveling time 40%", i.e. a first type ratio is 40%, and a second selection condition as "vehicle traveling oil consuming 20%", i.e. a second type ratio is 20% on a plurality of adjustment elements at the user interface. At this time, the selection condition corresponds to one of the DDR databases 11, wherein the adjustment elements are presented as a lateral slider, a longitudinal slider, a rotation plate, and the like. However, these are merely examples without limiting the present invention. The adjustment elements each may provide a type ratio of a percent from 0 to 100. When the adjustment element has a percent of 0, it is indicated that the selection condition is not selected. When the adjustment element has a percent of a value other than "0", the percent of the selection condition is a type ratio of the adjustment element. However, this is merely an example without limiting the present invention. Since the selection condition corresponds to one of the DDR databases 11, the type ratio also corresponds to one of the DDR databases 11.

After the user select the initial path node, the end path node, and a set of selection condition, the receiving module 12 may receive at the user interface the initial path node, the end path node, and a set of type ratios.

Thereafter, the querying module 13 may query the vehicle traveling history data and the path corresponding thereto from each of the DDR databases 11 according to the received initial and end path nodes.

As the example described above, the query module 13 may locate the five paths as mentioned above according to the received initial path node "path node A" and end path node "path node I" from the first DDR database, and the vehicle traveling history data corresponding to the five paths, respectively, are also as what have been mentioned above, and thus omitted herein for clarity.

The querying module 13 may query the paths corresponding to the initial path node "path node A" and the end path node "path node I" as received from a second DDR database, and the vehicle traveling history data corresponding thereto, respectively are also presented as above and thus omitted herein for clarity.

Thereafter, the calculating module 15 may first delete discrete and excluded which is set vehicle traveling history data, which corresponds generally to some particular vehicle traveling conditions, such as an accident, and a road construction. However, these are merely examples without limiting the present invention. Therefore, such vehicle traveling history data has to be deleted so as to avoid an inaccurate analysis result. The calculating module 15 calculates the vehicle traveling history data of the paths according to each of the DDR database to obtain a calculation result, respectively, and calculates a type calculation data for providing a user path according to the calculation result. That is, the calculating module 15 sorts the vehicle traveling history data of the paths according to each of the DDR database to obtain a sorting result, respectively, and further calculates an average rank of each of the paths according to the sorting result to calculate a type calculation data.

As the example described above, the first DDR database sorts the vehicle traveling history data corresponding to the first, second, third, fourth, and fifth paths, respectively, and obtains the sorting result as 295, 300, 300, 305, 340, 350, 350, 360, 390, 400, 400, 410, 410, 420, 420, 430, 490, 500, 500, and 510".

The first path has its vehicle traveling history data ranks of "1", "2", "2", and "4", respectively, and thus the average rank of the first path, i.e. the type calculation data, is "2.25". The second path has its vehicle traveling history data ranks of "5", "6", "6", and "8", and thus the average rank of the second path, i.e. the type calculation data, is "6.25". The third path has its vehicle traveling history data ranks of "9", "10", "10", and "12", and thus the average rank of the third path, i.e. the type calculation data, is "10.25". The fourth path has its vehicle traveling history data ranks of "12", "14", "14", and "16", and thus the average rank of the fourth path, i.e. the type calculation data, is "14". The fifth path has its vehicle traveling history data ranks of "17", "18", "18", and "20", and thus the average rank of the fifth path, i.e. the type calculation data, is "18.25".

The second DDR database sorts the vehicle traveling history data corresponding to the first, second, third, fourth, and fifth paths, respectively, and obtains "the sorting result as 0.45, 0.5, 0.5, 0.55, 0.9, 1, 1, 1, 1.1, 1.2, 1.2, 1.4, 1.4, 1.5, 1.5, 1.6, 1.65, 1.7, 1.7, and 1.75".

The first path has its vehicle traveling history data ranks of "5", "6", "6", and "9", respectively, and thus the average rank of the first path, i.e. the type calculation data, is "6.5". The second path has its vehicle traveling history data ranks of "1", "2", "2", and "4", and thus the average rank of the second path, i.e. the type calculation data, is "2.25". The third path has its vehicle traveling history data ranks of "6", "10", "10", and "12", and thus the average rank of the third path, i.e. the type calculation data, is "9.5". The fourth path has its vehicle traveling history data ranks of "12", "14", "14", and "16", and thus the average rank of the fourth path, i.e. the type calculation data, is "14". The fifth path has its vehicle traveling history data ranks of "17", "18", "18", and "20", and thus the average rank of the fifth path, i.e. the type calculation data, is "18.25".

Thereafter, the path providing module 16 may normalize the type calculation data of the DDR databases according to the type ratios, and then the normalized type calculation data is subject to a weighting calculation to calculate an average mix rank of the paths. Further, the paths are sorted according to their average mix ranks, so as to provide the user to select path. That is, the path providing module 16 sorts the paths by introducing the weighting calculation on the type ratios and the average rank of the paths stored in the DDR databases, and calculates the average mix rank of the paths according to the sorting result, so as to provide the user to select path.

As the example described above, since the first type ratio is "40%", and the second type ratio is "20%", a weighting of the first type ratio is "0.67" and a weighting of the second type ratio is "0.33", the average rank, i.e. the type calculation data, of the first path stored in the first DDR database is "2.25". For the same DDR database, the average rank, i.e. the type calculation data, of the second path "6.25", the average rank, i.e. the type calculation data, of the third path is "10.25", the average rank, i.e. the type calculation data, of the fourth path is "14", and the average rank, i.e. the type calculation data, of the fifth path is "18.25". The type calculation data of the five paths are then multiplied respectively by the first type ratio "0.67" to obtain "1.51", "4.19", "6.87", "9.38", and "12.23", respectively.

Since the first type ratio is "40%", and the second type ratio is "20%", i.e. a weighting of the first type ratio is "0.67" and a weighting of the second type ratio is "0.33", the average rank, i.e. the type calculation data, of the first path stored in the second DDR database is "6.5". For the same DDR database, the average rank, i.e. the type calculation data, of the second path "2.25", the average rank, i.e. the type calculation data, of the third path is "9.5", the average rank, i.e. the type calculation data, of the fourth path is "14", and the average rank, i.e. the type calculation data, of the fifth path is "18.25". The type calculation data of the five paths are then multiplied respectively by the second type ratio "0.33" to obtain "2.15", "0.75", "3.14", "4.62", and "6.02", respectively.

Therefore, "1.51", "4.19", "6.87", "9.38", "12.23", "2.15", "0.75", "3.14", "4.62", and "6.02" are further sorted as "0.75, 1.51, 2.15, 3.14, 4.19, 4.62, 6.02, 6.87, 9.38, and 12.23".

The first path has its ranks of "2" and "3", respectively, and thus the average mix rank of the first path is "2.5". The second path has its ranks of "1" and "5", respectively, and thus the average mix rank of the second path is "3". The third path has its ranks of "4" and "8", respectively, and thus the average mix rank of the third path is "6". The fourth path has its ranks of "6" and "7", respectively, and thus the average mix rank of the first path is "6.5". The fifth path has its ranks of "7" and "10", respectively, and thus the average mix rank of the first path is "8.5".

Then, the paths are ranked according to their average mix rank as "the first path, the second path, the fourth path and the fifth path", and which is provided for the user to select path.

Figure 2:
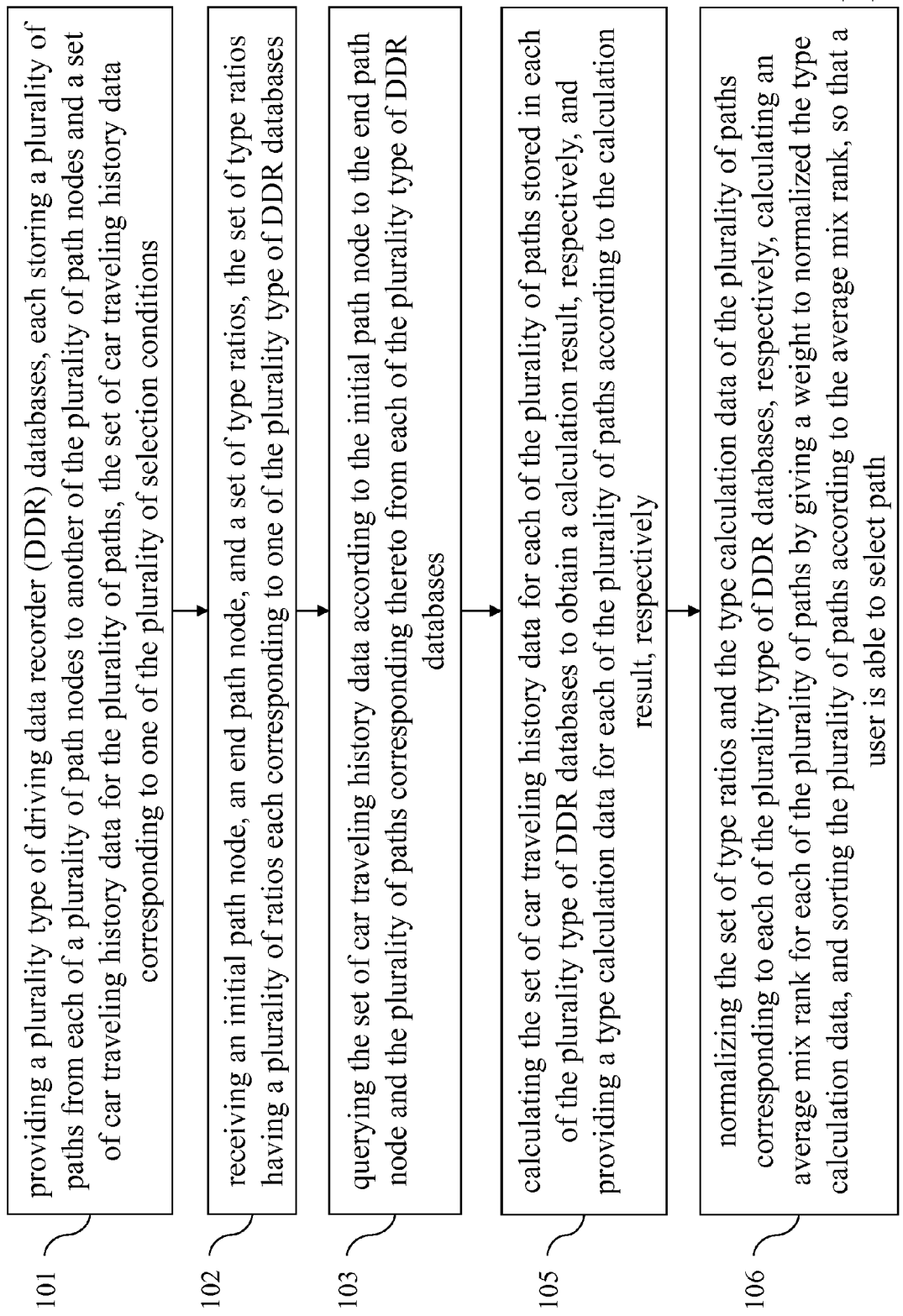
FIG. 2 is a flowchart of a method for selecting a path according to a plurality of selection conditions according to the present invention.

Thereafter, an example is set forth to explain how the present invention operates and the corresponding process flow, and which will be proceeded by referring to FIG. 1 and FIG. 2, wherein FIG. 2 is a flowchart of a method for selecting a path according to a plurality of selection conditions according to the present invention.

Figure 3:
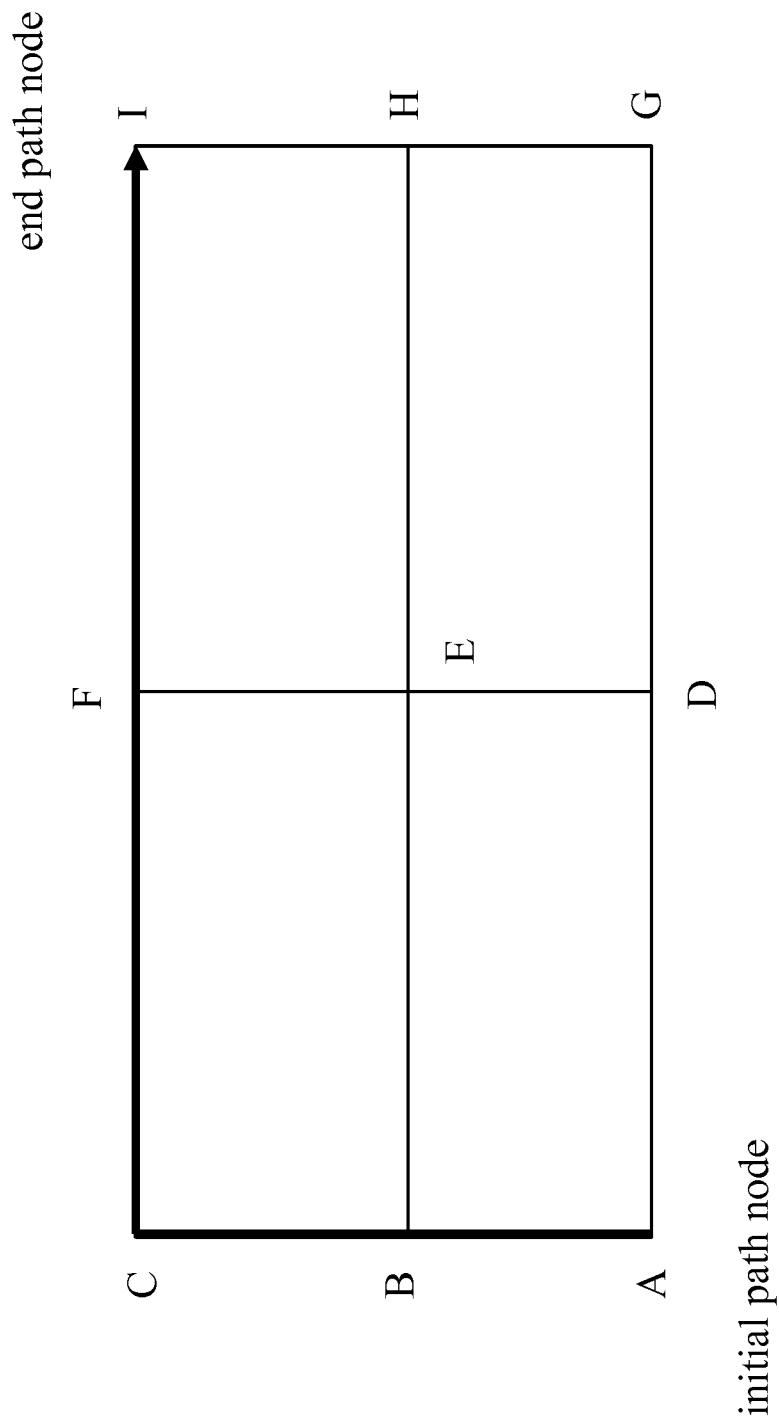
FIG. 3 is a schematic diagram of paths and path nodes according to the present invention.

Referring to FIG. 3, which is a schematic diagram of paths and path nodes according to the present invention.

As shown in FIG. 3, path nodes A, B, C, D, E, F, G, H, and I are connected as a Chinese character "farmland".

The path nodes A to I may include the following six paths "path node A-path node B-path node C, path node F-path node I" (only this path is shown in FIG. 3 for description and clarity, without limiting the present invention), "path node A-path node B-path node E, path node F-path node I", "path node A-path node B-path node E, path node H-path node I", "path node A-path node D-path node E, path node F-path node I", "path node A-path node D-path node E, path node H-path node I", and "path node A-path node D-path node G, path node H-path node I"

Figure 4A:
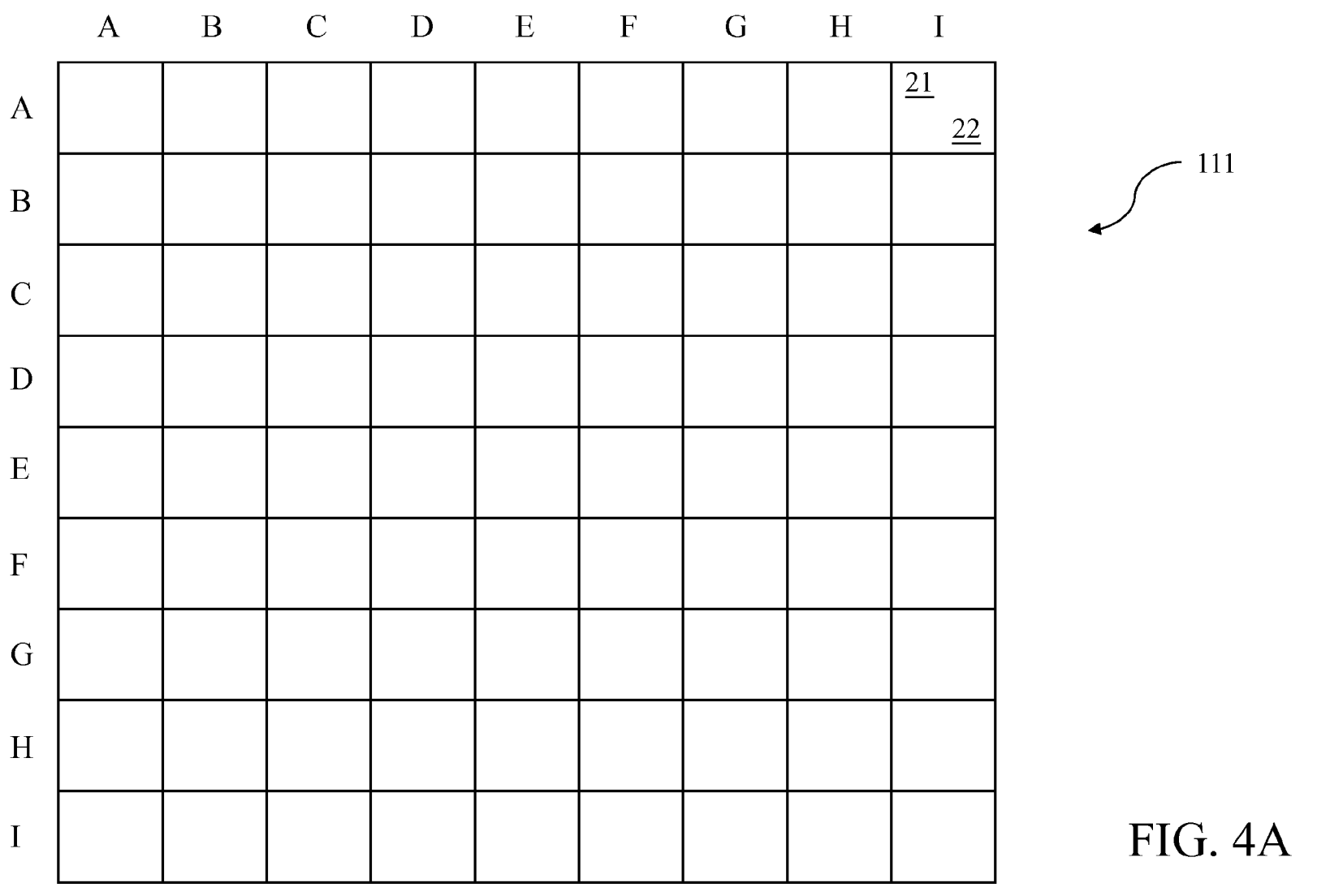

Thereafter, referring to FIG. 4A and FIG. 4B, which are a schematic diagram of the first DDR database according to the present invention, and a schematic diagram of the vehicle traveling history data of the first DDR database according to the present invention, respectively.

In the first DDR database 111, paths of path node A to path node B, path node A to path node C, path node A to path node D, . . . , path node A to I, path node B to path node A, path node B to path node C, path node B to path node D, . . . , path node B to path node I, path node C to path node A, path mode C to path node B, path node C to path node D, . . . , path node C to path node I, path node I to path node A, path node I to path node B, path node I to path node C, . . . , path node I to path node H, and the vehicle traveling history data corresponding thereto, respectively are stored. However, these are merely examples, without limiting the present invention.

In this embodiment, in the first DDR database 111, the paths 21 from path node A to path node I and the corresponding vehicle traveling history data 22 are stored. The paths 21 includes a first path 211 "path node A-path node B-path node C-path node F-path node I", a second path 212 "path node A-path node B-path node E-path node F-path node I", a third path 213 "path node A-path node D-path node E-path node F-path node I", a fourth path 214 "path node A-path node D-path node E-path node H-path node I", and a fifth path 215 "path node A-path node D-path node G-path node H-path node I" (S101).

With respect to the first path "path node A-path node B-path node C-path node F-path node I" 211, the corresponding set of vehicle traveling history data 221 includes "traveling time 300 seconds", "traveling time 295 seconds", "traveling time 305 seconds" and "traveling time 300 seconds". However, these are merely examples, without limiting the present invention (S101).

With respect to the second path "path node A-path node B-path node E-path node F-path node I" 212, the corresponding set of vehicle traveling history data 222 includes "traveling time 350 seconds", "traveling time 360 seconds", "traveling time 340 seconds", and "traveling time 350 seconds". However, these are merely examples, without limiting the present invention (S101).

With respect to the third path "path node A-path node D-path node E-path node F-path node I" 213, the set of vehicle traveling history data 223 includes "traveling time 400 seconds", "traveling time 390 seconds", "traveling time 410 seconds", and "traveling time 400 seconds". However, these are merely examples, without limiting the present invention (S101).

With respect to the fourth path "path node A-path node D-path node E-path node H-path node I" 214, the set of vehicle traveling history data 224 includes "traveling time 420 seconds", "traveling time 410 seconds", "traveling time 430 seconds" and "traveling time 420 seconds". However, these are merely examples, without limiting the present invention (S101).

With respect to the fifth path "path node A-path node D-path node G-path node H-path node I" 215, the corresponding set of vehicle traveling history data 225 includes "traveling time 500 seconds", "traveling time 490 seconds", "traveling time 510 seconds", and "traveling time 500 seconds". However, these are merely examples, without limiting the present invention (S101).

Thereafter, referring to FIG. 5A and FIG. 5B, which are a schematic diagram of the second DDR database according to the present invention, and a schematic diagram of the vehicle traveling history data of the second DDR database according to the present invention, respectively.

In the second DDR database 112, paths of path node A to path node B, path node A to path node C, path node A to path node D, . . . , path node A to I, path node B to path node A, path node B to path node C, path node B to path node D, . . . , path node B to path node I, path node C to path node A, path mode C to path node B, path node C to path node D, . . . , path node C to path node I, path node I to path node A, path node I to path node B, path node I to path node C, . . . , path node I to path node H, and the vehicle traveling history data corresponding thereto, respectively are stored. However, these are merely examples, without limiting the present invention.

In this embodiment, in the second DDR database 112, the paths 31 from path node A to path node I and the corresponding vehicle traveling history data 32 are stored. The paths 21 includes a first path 311 "path node A-path node B-path node C-path node F-path node I", a second path 312 "path node A-path node B-path node E-path node F-path node I", a third path 313 "path node A-path node D-path node E-path node F-path node I", a fourth path 314 "path node A-path node D-path node E-path node H-path node I", and a fifth path 315 "path node A-path node D-path node G-path node H-path node I" (S101).

With respect to the first path "path node A-path node B-path node C-path node F-path node I" 311, the corresponding set of vehicle traveling history data 321 includes "vehicle traveling oil consumption 1 liter", "vehicle traveling oil consumption 0.9 liters", "vehicle traveling oil consumption 1.1 liters", and "vehicle traveling oil consumption 1 liters". However, these are merely examples, without limiting the present invention (S101).

With respect to the second path "path node A-path node B-path node E-path node F-path node I", the corresponding set of vehicle traveling history data 322 includes "vehicle traveling oil consumption 0.5 liters", "vehicle traveling oil consumption 0.45 liters", "vehicle traveling oil consumption 0.55 liters", and "vehicle traveling oil consumption 0.5 liters". However, these are merely examples, without limiting the present invention (S101).

With respect to the third path "path node A-path node D-path node E-path node F-path node I", 313 the set of vehicle traveling history data 323 includes "vehicle traveling oil consumption 1.2 liters", "vehicle traveling oil consumption 1 liters", "vehicle traveling oil consumption 1.4 liters", and "vehicle traveling oil consumption 1.2 liters". However, these are merely examples, without limiting the present invention (S101).

With respect to the fourth path "path node A-path node D-path node E-path node H-path node I" 314, the set of vehicle traveling history data 324 includes "vehicle traveling oil consumption 1.5 liters", "vehicle traveling oil consumption 1.6 liters", "vehicle traveling oil consumption 1.4 liters" and "vehicle traveling oil consumption 1.5 liters". However, these are merely examples, without limiting the present invention (S101).

With respect to the fifth path "path node A-path node D-path node G-path node H-path node I" 315, the corresponding set of vehicle traveling history data 325 includes "vehicle traveling oil consumption 1.7 liters", "vehicle traveling oil consumption 1.65 liters", "vehicle traveling oil consumption 1.75 liters", and "vehicle traveling oil consumption 1.7 liters". However, these are merely examples, without limiting the present invention (S101).

Thereafter, referring to FIG. 6A and FIG. 6B, which are a schematic diagram of the third DDR database according to the present invention, and a schematic diagram of the vehicle traveling history data of the third DDR database according to the present invention, respectively.

In the third DDR database 113, paths of path node A to path node B, path node A to path node C, path node A to path node D, . . . , path node A to I, path node B to path node A, path node B to path node C, path node B to path node D, . . . , path node B to path node I, path node C to path node A, path mode C to path node B, path node C to path node D, . . . , path node C to path node I, path node I to path node A, path node I to path node B, path node I to path node C, . . . , path node I to path node H, and the vehicle traveling history data corresponding thereto, respectively are stored. However, these are merely examples, without limiting the present invention.

In this embodiment, in the third DDR database 113, the paths 41 from path node A to path node I and the corresponding vehicle traveling history data 42 are stored. The paths 41 includes a first path 411 "path node A-path node B-path node C-path node F-path node I", a second path 412 "path node A-path node B-path node E-path node F-path node I", a third path 413 "path node A-path node D-path node E-path node F-path node I", a fourth path 414 "path node A-path node D-path node E-path node H-path node I", and a fifth path 415 "path node A-path node D-path node G-path node H-path node I" (S101).

With respect to the first path "path node A-path node B-path node C-path node F-path node I" 411, the corresponding set of vehicle traveling history data 421 includes "vehicle traveling behavior value 3", "vehicle traveling behavior value 3.5", "vehicle traveling behavior value 2.5", and "vehicle traveling behavior value 3". However, these are merely examples, without limiting the present invention. The vehicle traveling behaviors are obtained by synthetically analyzing a vehicle speed, an acceleration, a braking, an engine rotation speed, steering rotation, and the like (S101).

With respect to the second path "path node A-path node B-path node E-path node F-path node I" 412, the corresponding set of vehicle traveling history data 422 includes "vehicle traveling behavior value 4", "vehicle traveling behavior value 4", "behavior value 4", and "behavior value 4". However, these are merely examples, without limiting the present invention (S101).

With respect to the third path "path node A-path node D-path node E-path node F-path node I", 413 the set of vehicle traveling history data 423 includes "vehicle traveling behavior value 5", "vehicle traveling behavior 4.5", "vehicle traveling behavior value 4", and "vehicle traveling behavior 4.5". However, these are merely examples, without limiting the present invention (S101).

With respect to the fourth path "path node A-path node D-path node E-path node H-path node I" 414, the set of vehicle traveling history data 424 includes "vehicle traveling behavior value 2", "vehicle traveling behavior value 1", "vehicle traveling behavior value 3" and "vehicle traveling behavior value 2". However, these are merely examples, without limiting the present invention (S101).

With respect to the fifth path "path node A-path node D-path node G-path node H-path node I" 415, the corresponding set of vehicle traveling history data 425 includes "vehicle traveling behavior value 0", "vehicle traveling behavior value 0.5", "vehicle traveling behavior value 1", and "vehicle traveling behavior value 0.5". However, these are merely examples, without limiting the present invention (S101).

Figure 7:
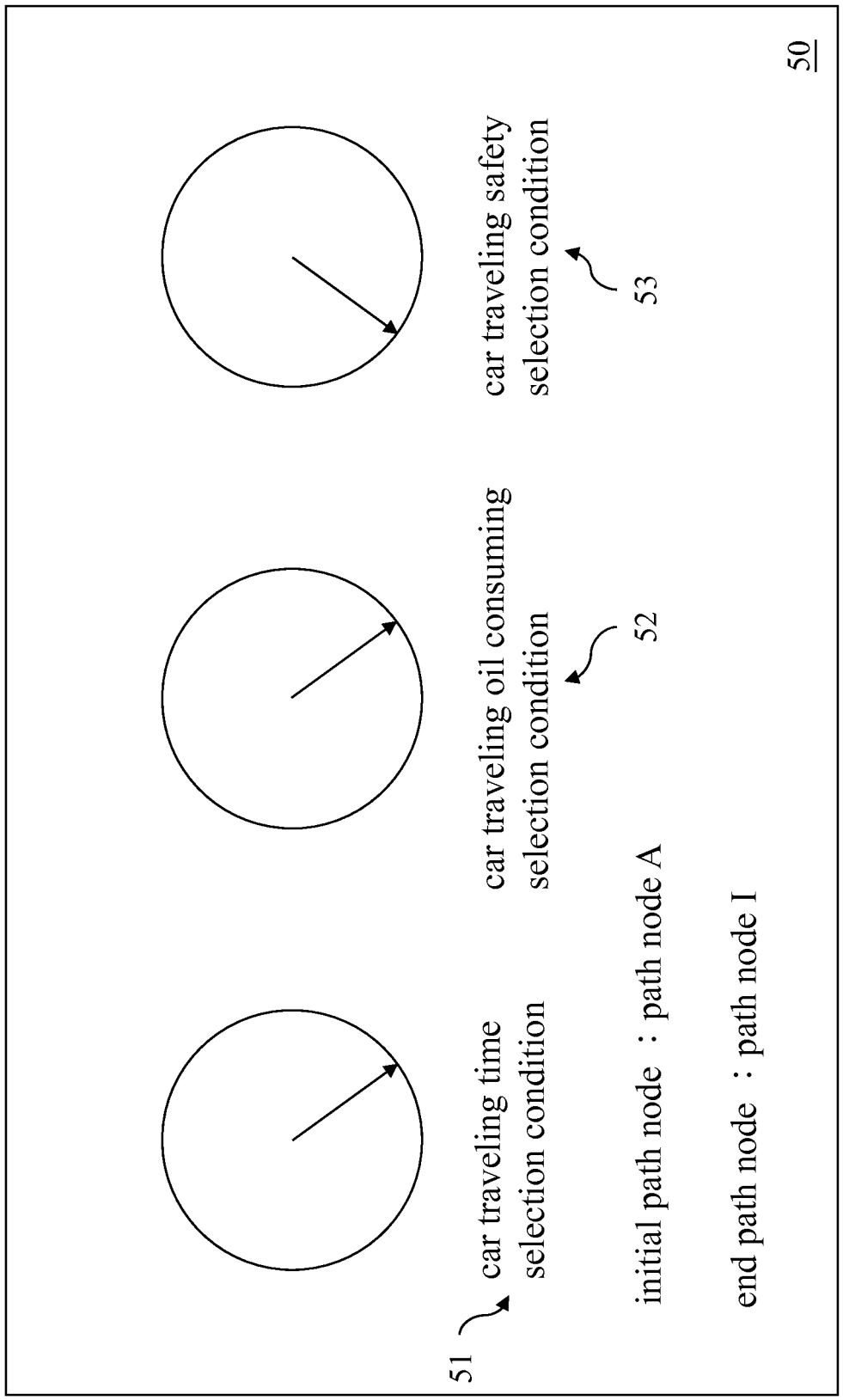
FIG. 7 is a schematic diagram of a user interface according to the present invention.

Thereafter, referring to FIG. 7, which is a schematic diagram of a user interface according to the present invention.

The user selects path node A as the initial path node and path nohterde I as the end path node at the user interface 50. Further, a vehicle traveling time selection condition 51 is selected as "40%", i.e. the first type ratio is "40%" corresponding to the first DDR database 111; a vehicle traveling oil consumption selection condition 52 is selected as "40%", i.e. the second type ratio is "40%" corresponding to the second DDR database 111; and a vehicle traveling safety selection condition 53 is selected as "60%", i.e. the third type ratio is "60%" corresponding to the third DDR database 113.

In FIG. 7, the vehicle traveling time selection condition 51, the vehicle traveling oil consumption condition 52, and the vehicle traveling safety selection condition 53 is schematically shown as a rotation wheel, without limiting the present invention. the vehicle traveling time selection condition 51, the vehicle traveling oil consumption condition 52, and the vehicle traveling safety selection condition 53 is also schematically shown as a scrollbar, In addition, the receiving module 12 receives the initial path node, the end path node, and the first, second and third type ratios from the user interface 50 (S102).

Thereafter, the querying module 13 may query the first to fifth paths 211-215 and the vehicle traveling history data 221-225 corresponding thereto from each of the DDR database 111 according to the received initial and end path nodes, "path node A" and "path node I", respectively (S103).

The querying module 13 may query the first to fifth paths 311-315 from the second DDR database 112 according to the initial path node "path node A" and the end path node "path node I" and the vehicle traveling history data 321-325 corresponding to the first to fifth paths 311-315 (S103). The querying module 13 may query the first to fifth paths 411-415 from the third DDR database 113 according to the initial path node "path node A" and the end path node "path node I" and the vehicle traveling history data 421-425 corresponding to the first to fifth paths 411-415 (S103).

Thereafter, the first DDR database 111 sorts the vehicle traveling history data 221-225 corresponding to the first, second, third, fourth, and fifth paths 211-215, respectively, and obtains the sorting result as 295, 300, 300, 305, 340, 350, 350, 360, 390, 400, 400, 410, 410, 420, 420, 430, 490, 500, 500, and 510".

The first path has its vehicle traveling history data ranks of "1", "2", "2", and "4", respectively, and thus the average rank of the first path, i.e. the type calculation data, is "2.25". The second path has its vehicle traveling history data ranks of "5", "6", "6", and "8", and thus the average rank of the second path, i.e. the type calculation data, is "6.25". The third path has its vehicle traveling history data ranks of "9", "10", "10", and "12", and thus the average rank of the third path, i.e. the type calculation data, is "10.25". The fourth path has its vehicle traveling history data ranks of "12", "14", "14", and "16", and thus the average rank of the fourth path, i.e. the type calculation data, is "14". The fifth path has its vehicle traveling history data ranks of "17", "18", "18", and "20", and thus the average rank of the fifth path, i.e. the type calculation data, is "18.25".

The second DDR database 112 sorts the vehicle traveling history data 321-325 corresponding to the first, second, third, fourth, and fifth paths 311-315, respectively, and obtains "the sorting result as 0.45, 0.5, 0.5, 0.55, 0.9, 1, 1, 1, 1.1, 1.2, 1.2, 1.4, 1.4, 1.5, 1.5, 1.6, 1.65, 1.7, 1.7, and 1.75".

The first path has its vehicle traveling history data ranks of "5", "6", "6", and "9", respectively, and thus the average rank of the first path, i.e. the type calculation data, is "6.5" (S105). The second path has its vehicle traveling history data ranks of "1", "2", "2", and "4", and thus the average rank of the second path, i.e. the type calculation data, is "2.25" (S105). The third path has its vehicle traveling history data ranks of "6", "10", "10", and "12", and thus the average rank of the third path, i.e. the type calculation data, is "9.5" (S105). The fourth path has its vehicle traveling history data ranks of "12", "14", "14", and "16", and thus the average rank of the fourth path, i.e. the type calculation data, is "14" (S105). The fifth path has its vehicle traveling history data ranks of "17", "18", "18", and "20", and thus the average rank of the fifth path, i.e. the type calculation data, is "18.25" (S105).

The third DDR database 113 sorts the vehicle traveling history data 421-425 corresponding to the first, second, third, fourth, and fifth paths 411-415, respectively, and obtains "the sorting result as 5, 4.5, 4.5, 4, 4, 4, 4, 4, 3.5, 3, 3, 3, 2.5, 2, 2, 1, 1, 0.5, 0.5, and 0"

The first path has its vehicle traveling history data ranks of "9", "10", "10", and "13", respectively, and thus the average rank of the first path, i.e. the type calculation data, is "10.5" (S105). The second path has its vehicle traveling history data ranks of "4", "4", "4", and "4", and thus the average rank of the second path, i.e. the type calculation data, is "4" (S105). The third path has its vehicle traveling history data ranks of "1", "2", "2", and 4", and thus the average rank of the third path, i.e. the type calculation data, is "2.25" (S105). The fourth path has its vehicle traveling history data ranks of "10", "14", "14", and "16", and thus the average rank of the fourth path, i.e. the type calculation data, is "13.5" (S105). The fifth path has its vehicle traveling history data ranks of "16", "18", "18", and "20", and thus the average rank of the fifth path, i.e. the type calculation data, is "18" (S105).

Since the first type ratio is "40%", the second type ratio is "20%" and the third type ratio is "60%", i.e. the weighting of the first type ratio is "0.29", a weighting of the second type ratio is "0.29", and a weighting of the third type ratio is "0.43", the average rank, i.e. the type calculation data, of the first path stored in the first DDR database is "2.25". For the same DDR database, the average rank, i.e. the type calculation data, of the second path "6.25", the average rank, i.e. the type calculation data, of the third path is "6.25", the average rank, i.e. the type calculation data, of the fourth path is "14", and the average rank, i.e. the type calculation data, of the fifth path is "18.25". The type calculation data of the five paths are then multiplied respectively by the first type ratio "0.29" to obtain "0.65", "1.81", "2.97", "4.06", and "5.29", respectively.

Since the first type ratio is "40%", and the second type ratio is "60%", i.e. a weighting of the first type ratio is "0.29", a weighting of the second type ratio is "0.29", and a weighting of the third type ratio is "0.43", the average rank, i.e. the type calculation data, of the first path stored in the second DDR database is "6.5". For the same DDR database, the average rank, i.e. the type calculation data, of the second path "2.25", the average rank, i.e. the type calculation data, of the third path is "9.5", the average rank, i.e. the type calculation data, of the fourth path is "14", and the average rank, i.e. the type calculation data, of the fifth path is "18.25". The type calculation data of the five paths are then multiplied respectively by the second type ratio "0.29" to obtain "1.89", "0.65", "2.76", "4.06", and "5.29", respectively.

Since the first type ratio is "40%", the second type ratio is "40%", and the third type ratio is "60%", i.e. a weighting of the first type ratio is "0.29", a weighting of the second type ratio is "0.29", and a weighting of the third type ratio is "0.43", the average rank, i.e. the type calculation data, of the first path stored in the third DDR database is "10.5". For the same DDR database, the average rank, i.e. the type calculation data, of the second path "4", the average rank, i.e. the type calculation data, of the third path is "2.25", the average rank, i.e. the type calculation data, of the fourth path is "13.5", and the average rank, i.e. the type calculation data, of the fifth path is "18". The type calculation data of the five paths are then multiplied respectively by the second type ratio "0.43" to obtain "4.52", "1.72", "0.97", "5.81", and "7.74", respectively.

Thereafter, "0.65", "1.81", "2.97", "4.06", "5.29", "4.52", "1.72", "0.97", "5.81", "7.74", "4.52", "1.72", "0.97", "5.81", and "7.74" are further sorted as 0.65, 0.97, 0.97, 1.72, 1.72, 1.81, 2.97, 4.06, 4.52, 4.52, 5.29, 5.81, 5.81, 7.74, and 7.74".

The first path has its ranks of "1", "9" and "9", respectively, and thus the average mix rank of the first path is "6.33". The second path has its ranks of "4", "4" and "6", respectively, and thus the average mix rank of the second path is "4.67". The third path has its ranks of "2", "2", and "7", respectively, and thus the average mix rank of the third path is "3.67". The fourth path has its ranks of "8", "12" and "12", respectively, and thus the average mix rank of the first path is "10.67". The fifth path has its ranks of "11", "14" and "14", respectively, and thus the average mix rank of the first path is "13".

Then, the paths are ranked according to their average mix rank as "the third path, the second path, the first path, the fourth path and the fifth path", and which is provided for the user to select path (S106).

In view of the above, the system and method of the present invention has the difference as compared to the prior art that the vehicle traveling history data stored in the plurality type of DDR databases established previously are analyzed, and then the plurality type of DDR databases are screened out by further referring to the plurality of type ratios provided by the user, and then a desired path is selected.

By use of the above technical means, the issue encountered in the prior art where the shortest path manner provided by the vehicle navigation device cannot satisfy the multiple vehicle traveling conditions may be solved, and the technical efficacy of providing a path selection by integrating a plurality of vehicle traveling conditions may be achieved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A system for selecting a path according to a plurality of selection conditions, comprising:
    a plurality type of driving data recorder (DDR) databases, each storing a plurality of paths from each of a plurality of path nodes to another of the plurality of path nodes and a set of vehicle traveling history data for the plurality of paths, the set of vehicle traveling history data corresponding to one of the plurality of selection conditions;
    a receiving module, receiving an initial path node, an end path node, and a set of type ratios, the set of type ratios having a plurality of ratios each corresponding to one of the plurality type of DDR databases;
    a querying module, querying the set of vehicle traveling history data according to the initial path node to the end path node and the plurality of paths corresponding thereto from each of the plurality type of DDR databases;
    a calculating module, calculating the set of vehicle traveling history data for each of the plurality of paths stored in each of the plurality type of DDR databases to obtain a calculation result, respectively, and providing a type calculation data for each of the plurality of paths according to the calculation result, respectively; and
    a path providing module, normalizing the set of type ratios and the type calculation data of the plurality of paths corresponding to each of the plurality type of DDR databases, respectively, calculating an average mix rank for each of the plurality of paths by giving a weight to normalized the type calculation data, and sorting the plurality of paths according to the average mix rank, so that a user is able to select path.

2. The system as claimed in claim 1, wherein the calculating module sorts the vehicle traveling history data of each of the plurality of paths according to the plurality type of DDR databases, to obtain a ranking result, respectively, and calculating an average rank of each of the plurality of paths to calculate the type calculation data according to the ranking result, respectively, and the path providing module sorts the plurality of paths according to a weighting calculation on the set of type ratios and the average rank of the plurality of paths corresponding to the plurality type of DDR databases, respectively, calculates the average mix rank of the plurality of paths according to the sorting result, respectively, and sorts the plurality of paths according to the average mix rank thereof, so as to provide the user to select path.

3. The system as claimed in claim 1, wherein the vehicle traveling history data comprises a vehicle traveling time, a vehicle traveling oil consuming and a vehicle traveling indicator which is calculated correspondence with one of the plurality of paths.

4. The system as claimed in claim 3, wherein the vehicle traveling indicator which is correspondence with one of the plurality of paths is obtained by analyzing synthetically a vehicle speed data, a vehicle traveling back-and-forth acceleration data, a braking behavior data, an engine rotation speed data, a steering wheel rotation data, a vehicle angular-speed data, a vehicle traveling lateral-acceleration data, a vehicle traveling longitudinal-acceleration data in a vehicle traveling course.

5. The system as claimed in claim 1, wherein the calculating module further deletes the vehicle traveling history data which is discrete and excluded which is set for each of the plurality of paths and then calculates the vehicle traveling history data for each of the plurality of paths according to each of the plurality type of the DDR databases.

6. A method for selecting a path according to a plurality of selection conditions, comprising steps of:
    providing a plurality type of driving data recorder (DDR) databases, each storing a plurality of paths from each of a plurality of path nodes to another of the plurality of path nodes and a set of vehicle traveling history data for the plurality of paths, the set of vehicle traveling history data corresponding to one of the plurality of selection conditions;
    receiving an initial path node, an end path node, and a set of type ratios, the set of type ratios having a plurality of ratios each corresponding to one of the plurality type of DDR databases;
    querying the set of vehicle traveling history data according to the initial path node to the end path node and the plurality of paths corresponding thereto from each of the plurality type of DDR databases;
    calculating the set of vehicle traveling history data for each of the plurality of paths stored in each of the plurality type of DDR databases to obtain a calculation result, respectively, and providing a type calculation data for each of the plurality of paths according to the calculation result, respectively; and
    normalizing the set of type ratios and the type calculation data of the plurality of paths corresponding to each of the plurality type of DDR databases, respectively, calculating an average mix rank for each of the plurality of paths by giving a weight to normalized the type calculation data, and sorting the plurality of paths according to the average mix rank, so that a user is able to select path.

7. The method as claimed in claim 6, wherein the step of calculating the set of vehicle traveling history data for each of the plurality of paths stored in each of the plurality type of DDR databases to obtain the calculation result, respectively, and providing the type calculation data for each of the plurality of paths according to the calculation result, respectively, comprises steps of:

sorting the vehicle traveling history data of each of the plurality of paths according to the plurality type of DDR databases, to obtain a ranking result, respectively, and calculating an average rank of each of the plurality of paths to calculate the type calculation data according to the ranking result, respectively;

wherein the set of type ratios are determined by user or the set of type ratios are default.

8. The method as claimed in claim 6, wherein the vehicle traveling history data comprises a vehicle traveling time, a vehicle traveling oil consuming, a vehicle traveling 3-dimension acceleration data and a vehicle traveling indicator which is calculated correspondence with one of the plurality of paths.

9. The method as claimed in claim 8, wherein the vehicle traveling indicator correspondence with one of the plurality of paths is obtained by analyzing synthetically a vehicle speed data, a vehicle traveling back-and-forth acceleration data, a braking behavior data, an engine rotation speed data, a steering wheel rotation data, a vehicle angular-speed data, a vehicle traveling lateral-acceleration data, a vehicle traveling longitudinal-acceleration data in a vehicle traveling course.

10. The method as claimed in claim 6, wherein the step of calculating the set of vehicle traveling history data for each of the plurality of paths stored in each of the plurality type of DDR databases to obtain a calculation result, respectively, and providing a type calculation data for each of the plurality of paths according to the calculation result, respectively further comprises a step of deleting the vehicle traveling history data which is discrete and excluded which is set for each of the plurality of paths and then calculates the vehicle traveling history data for each of the plurality of paths according to each of the plurality type of the DDR databases.

* * * * *